US009045324B2

(12) United States Patent
Harrell

(10) Patent No.: US 9,045,324 B2
(45) Date of Patent: Jun. 2, 2015

(54) FUEL DISPENSER MANAGEMENT

(75) Inventor: Daniel C. Harrell, Round Rock, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 2197 days.

(21) Appl. No.: 11/559,837

(22) Filed: Nov. 14, 2006

(65) Prior Publication Data

US 2007/0261760 A1 Nov. 15, 2007

Related U.S. Application Data

(63) Continuation-in-part of application No. 10/411,524, filed on Apr. 10, 2003, now Pat. No. 7,624,042.

(60) Provisional application No. 60/736,456, filed on Nov. 14, 2005.

(51) Int. Cl.
*G06Q 20/00* (2012.01)
*B67D 7/08* (2010.01)

(52) U.S. Cl.
CPC .......................................... *B67D 7/08* (2013.01)

(58) Field of Classification Search
CPC combination set(s) only.
See application file for complete search history.

(56) References Cited

U.S. PATENT DOCUMENTS

| | | | |
|---|---|---|---|
| 3,184,714 | A | 5/1965 | Brown, Jr. et al. |
| 3,786,421 | A | 1/1974 | Wostl et al. |
| 5,945,975 | A | 8/1999 | Lundrigan et al. |
| 6,032,126 | A | 2/2000 | Kaehler |
| 6,116,505 | A | 9/2000 | Withrow |
| 6,128,551 | A | 10/2000 | Davis et al. |
| 6,152,591 | A | 11/2000 | McCall et al. |
| 6,193,154 | B1 | 2/2001 | Phillips et al. |
| 6,367,516 | B1 | 4/2002 | Christman et al. |
| 6,386,323 | B1 | 5/2002 | Ramachandran et al. |
| 6,427,912 | B1 | 8/2002 | Levasseur |
| 6,526,335 | B1 | 2/2003 | Treyz et al. |

(Continued)

FOREIGN PATENT DOCUMENTS

| | | |
|---|---|---|
| EP | 1 782 400 B1 | 12/2009 |
| WO | WO 02/11087 | 2/2002 |
| WO | WO 02/065377 | 8/2002 |

OTHER PUBLICATIONS

Merriam Webster's Collegiate Dictionary, Tenth Edition, definition of "off-line", p. 807, copyright 1997.*

(Continued)

*Primary Examiner* — Paul Danneman
(74) *Attorney, Agent, or Firm* — Mintz Levin Cohn Ferris Glovsky and Popeo, P.C.

(57) ABSTRACT

Automated systems and processes may provide fuel dispenser management. In one aspect, a system for managing a fuel dispenser may include a dispenser manager, a display, a user input device, a fuel controller, and a management module at the fuel dispenser. The dispenser manager may be operable to control electronic functions of the fuel dispenser. The display may be coupled to the dispenser manager and operable to visually present fueling session data, and the user input device may also be coupled to the dispenser manager and operable to detect user indications during a fueling session. The fuel controller may be coupled to the dispenser manager and operable to control fuel flow operations. The management module may be associated with the dispenser manager and operable to generate operational commands for the dispenser manager.

19 Claims, 5 Drawing Sheets

(56) References Cited

U.S. PATENT DOCUMENTS

| | | | |
|---|---|---|---|
| 6,687,345 | B1 | 2/2004 | Swartz et al. |
| 6,725,106 | B1 | 4/2004 | Covington et al. |
| 6,736,313 | B1 | 5/2004 | Dickson |
| 6,801,835 | B2 | 10/2004 | Covington et al. |
| 6,824,049 | B2 | 11/2004 | Lee et al. |
| 2001/0049626 | A1 | 12/2001 | Nicholson |
| 2002/0107742 | A1 | 8/2002 | Magill |
| 2002/0116261 | A1 | 8/2002 | Moskowitz et al. |
| 2002/0147648 | A1 | 10/2002 | Fadden et al. |
| 2002/0156835 | A1 | 10/2002 | Williams et al. |
| 2003/0055530 | A1 | 3/2003 | Dodson |
| 2003/0131904 | A1 | 7/2003 | Dodson |
| 2004/0204999 | A1 | 10/2004 | Negley, III et al. |
| 2005/0071252 | A1 | 3/2005 | Henning et al. |
| 2005/0261916 | A1 | 11/2005 | McCall et al. |

OTHER PUBLICATIONS

Merriam Webster's Collegiate Dictionary, Tenth Edition, definition of "vending machine", p. 1310, copyright 1997.*

European Examination Report, EP Application No. 04 779 490.4, May 5, 2008, pp. 1-5.

PCT International Preliminary Report on Patentability, PCT/US2006/044256, Mar. 12, 2008, pp. 1-11.

International Search Report, PCT/US2006/044256, Apr. 13, 2007, pp. 1-3.

Written Opinion of the International Searching Authority, PCT/US2006/044256, Apr. 13, 2007, pp. 1-5.

PCT International Search Report, PCT/US2004/024445, Apr. 4, 2005, pp. 1-4.

Written Opinion of the International Searching Authority, PCT/US2004/024445, Apr. 4, 2005, pp. 1-6.

International Preliminary Report on Patentability, PCT/US2004/024445, Dec. 22, 2006, pp. 1-12.

Written Opinion of the International Searching Authority, PCT/US2004/024445, Sep. 13, 2006, pp. 1-5.

European Examination Report, EP Application No. 04 779 490.4-2211, May 30, 2007, pp. 1-6.

"No. 1 Convenience Store Chain Turns to NCR for Implementation of Store Solution" [online] May 25, 1999; Retrieved from the Internet URL: http://www.thefreelibrary.com/No.+1+Convenience+Store+Chain+Turns+to+NCR+for+Implementation+of...-a054716679.

Communication from EP Associate re Examination Report on EP Appl. No. 04 779 490.4, mailed May 30, 2007, 7 pages.

Scott R. Negley, III, et al., "In Dispenser Point-of-Sale Module for Fuel Dispensers" U.S. Appl. No. 10/411,524, filed Apr. 10, 2003, Office Action mailed Oct. 6, 2006, 16 pages.

Scott R. Negley, III, et al., "In Dispenser Point-of-Sale Module for Fuel Dispensers" U.S. Appl. No. 10/411,524, filed Apr. 10, 2003, Office Action mailed Apr. 6, 2007, 14 pages.

Scott R. Negley, III, et al., "In Dispenser Point-of-Sale Module for Fuel Dispensers" U.S. Appl. No. 10/411,524, filed Apr. 10, 2003, Office Action mailed Oct. 18, 2007, 16 pages.

Scott R. Negley, III, et al., "In Dispenser Point-of-Sale Module for Fuel Dispensers" U.S. Appl. No. 10/411,524, filed Apr. 10, 2003, Office Action mailed Jul. 24, 2008, 23 pages.

Scott R. Negley, III, et al., "In Dispenser Point-of-Sale Module for Fuel Dispensers" U.S. Appl. No. 10/411,524, filed Apr. 10, 2003, Office Action mailed Dec. 26, 2008, 16 pages.

Scott R. Negley, III, et al., "In Dispenser Point-of-Sale Module for Fuel Dispensers" U.S. Appl. No. 10/411,524, filed Apr. 10, 2003, Notice of Allowability mailed Jul. 2, 2009, 7 pages.

* cited by examiner

FUEL DISPENSER MANAGEMENT

RELATED APPLICATIONS

This application is a continuation-in-part of U.S. patent application Ser. No. 10/411,524, entitled "In Dispenser Point-of-Sale Module for Fuel Dispensers" and filed on Apr. 10, 2003, and claims the benefit of U.S. Provisional Patent Application No. 60/736,456, entitled "Fuel Dispenser Management" and filed on Nov. 14, 2005.

TECHNICAL FIELD

The present disclosure relates to dispensing fuel and, in particular, to managing fuel dispensers.

BACKGROUND

As the world's population continues to expand, more and more vehicles are being produced and used. Accompanying this increase in vehicles is an increased demand for fuel (e.g., gasoline) and facilities at which to obtain it. Some approaches to meeting the demand for the latter are to provide additional facilities (e.g., gas stations) at which motorists may fuel their vehicles and to increase the capacity of existing fueling facilities.

Unfortunately, in many areas (e.g., dense metropolitan cities), there is little space for additional fueling facilities or for increasing the capacity of the fueling facilities that are already in existence. Furthermore, certain environments, whether metropolitan, rural, or otherwise, may be considered unsafe for operating fueling facilities at all times of the day, especially at night. Thus, there may be geographic and time constraints that weigh against providing additional fueling opportunities for motorists.

SUMMARY

Systems and processes for managing a fuel dispenser may include one or more automated devices and/or techniques. In one general aspect, a fuel dispenser may include a dispenser manager, a display, a user input device, a fuel controller, and a management module. The dispenser manager may be operable to control electronic functions of the fuel dispenser, and the display, the user input device, and the fuel controller may be coupled to the dispenser manager. The display may be operable to visually present fueling session data, the user input device may be operable to detect user indications during a fueling session, and the fuel controller may be operable to control fuel flow operations. The management module may be associated with the dispenser manager and operable to generate operational commands for the dispenser manager.

In certain implementations, the management module may generate operational commands based on associated instructions. The instructions may, for example, dictate point-of-sale operations for the fuel dispenser, such as financial transaction rules. The instructions may allow the fuel dispenser to operate when the dispenser manager cannot receive operational commands from a facility controller.

The management module may include operating content and/or operating logs. The operating content may include data to be presented on the display, and the operating logs may include transaction logs. The data to be presented may include at least one of customer instructional prompts, fueling status, advertisements, and fuel prices. The transaction logs may include fueling session financial transaction logs and error logs.

In some implementations, the management module may include a point-of-sale module for providing point-of-sale operations at the fuel dispenser. The point-of-sale module may have an passive state and an active state. The point-of-sale module may remain in the passive state when the fuel dispenser can communicate with a facility controller and transition to the active state when the fuel dispenser cannot communicate with a facility controller. In certain implementations, the point-of-sale module may operate primarily in the active state.

In particular implementations, the management module may be operable to generate operational commands for the dispenser manager based on operational commands from a remote fueling facility computer.

In another general aspect, an autonomous management process performed by a fuel dispenser includes determining that a customer desires to initiate a fueling session, determining whether to dispense fuel, and, if fuel should be dispensed, dispensing fuel. Determining whether to dispense fuel may include requesting customer payment data, determining that customer payment data has been received, and determining whether the received customer payment data is acceptable.

Determining that a customer desires to initiate a fueling session may include detecting activation of a user input device, and requesting customer payment data may include generating a user interface for visual presentation on a display. Determining that customer payment data has been received may include detecting insertion of a payment card, and determining whether the received customer payment data is acceptable may include performing a checksum on an account number in the received payment card data. Dispensing fuel may include generating an activation signal for a fuel controller.

Certain implementations may include storing data regarding the fueling session for later download. The data may include customer payment data and fuel dispensing data.

Particular implementations may include determining that communication with a facility controller is available, placing a module responsible for determining whether to dispense fuel in a passive state, and receiving command signals regarding dispensing fuel. The implementations may also include determining that communication with a facility controller is not available and placing the module responsible for determining whether to dispense fuel in an active state.

In a particular aspect, a fuel dispensing system may include a fueling facility controller, a communication network, and a fuel dispenser. The fueling facility controller may be operable to provide point-of-sale and pump control operation commands to one or more fuel dispensers, and the communication network may be coupled to the fueling facility controller and the fuel dispenser to allow the fuel dispenser and the fueling facility controller to exchange data. The fuel dispenser may include a communication interface, a dispenser manager, a display, a user input device, a fuel controller, and a management module. The communication interface may be operable to receive operational commands from and convey customer and fuel dispensing data to the facility controller. The dispenser manager may be coupled to the communication interface and operable to control electronic functions of the fuel dispenser. The display may be coupled to the dispenser manager and operable to visually present fueling session data. The user input device may be coupled to the dispenser manager and operable to detect user input during a fueling session. The fuel controller may be coupled to the dispenser manager and operable to control fuel flow operations. The management module may be associated with the dispenser manager and operable to generate operational commands for the dispenser manager using operational commands, instructions, operating content, and operating logs. The operational commands may be received from a remote fueling facility computer, and the instructions may be for operating the fuel dispenser, and provide point-of-sale operations, including financial transaction rules, at the fuel dispenser. The operating content may be operable to be presented on the display to provide customer instructional prompts, fueling status information, advertisements, and fuel prices. The operating logs may include transaction logs containing fueling session financial transaction logs and error logs. The management module may have a passive state and an active state. The management module may remain in the passive state when the fuel dispenser can communicate with the facility controller, transition to the active state when the fuel dispenser cannot communicate with the facility controller, and return to the passive state when the fuel dispenser can communicate with the facility controller.

Various implementations may have one or more features. For example, the management module may provide a fuel dispenser with the ability to provide advanced features to a customer, such as a POS functionality. The management module may also allow the fuel dispenser to operate autonomously from the facility controller, at least for a certain period of time. Thus, the fuel dispenser may continue operating even if the facility controller and/or an intermediate communication network is unavailable.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Safety, reliability, and efficiency for fueling facilities may be improved by intelligent control of fuel dispensers. These benefits may apply not only to the actual dispensing of fuel at a fueling dispenser, but also to the customer to which the fuel is being dispensed. In particular implementations, a fueling facility process and/or system may include the ability to provide enhanced safety, reliability, and efficiency by providing enhanced management at one or more fuel dispensers. Intelligent control at a fuel dispenser may provide enhancements during a fueling session by allowing a fuel dispenser to perform operations typically provided by a remote system, especially if the remote system is unavailable. Thus, if the remote system or an intermediate communication system is inoperative, fueling sessions may proceed, allowing the fueling facility to continue operating and serving its customers.

Figure 1:
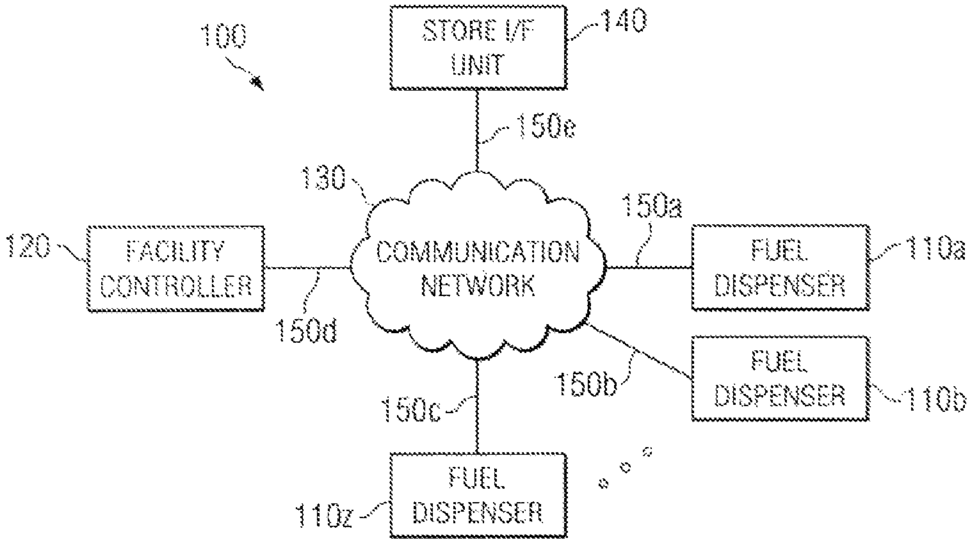
FIG. 1 is a block diagram illustrating one implementation of a system for fuel dispenser management.

FIG. 1 illustrates one implementation of a system 100 for fuel dispenser management. As illustrated, system 100 represents a retail fueling facility, and could be representative of a gas station environment, a convenience store environment, or any other appropriate type of retail fueling facility.

System 100 includes fuel dispensers 110, a facility controller 120, a communication network 130, and a store interface unit 140. Fuel dispensers 110 are operable to dispense fuel (e.g., gasoline, diesel, liquid propane, or ethanol) to customers at system 100, typically under at least partial control of facility controller 120. Communication network 130 allows facility controller 120 to communicate with fuel dispensers 120. Communication network 130 also allows fuel dispensers 110 and facility controller 120 to communicate with store interface unit 140. Store interface unit 140 is also operable to provide control functions to fuel dispensers 110.

In more detail, fuel dispensers 110 may be fuel dispensers, pumps, or any other appropriate fuel dispensing apparatuses. Fuel dispensers 110 may have single or multiple hose configurations. Depending on their configuration, fuel dispensers 110 may dispense one or more products (e.g., gasoline and diesel). Fuel dispensers 110 typically operate in cooperation with facility controller 120 and store interface unit 140 to dispense fuel. In doing so, a fuel dispenser may recognize when a customer is present (e.g., by detecting activation of an input device or removal of a pump handle) and notify facility controller 120, which may then obtain payment information from the customer, authenticate the customer, and allow fuel dispensing to begin. The fuel dispenser may also communicate the dispensed amount of fuel to the facility controller, which may complete the sales transaction when the customer is finished dispensing fuel. The fuel dispensers may, however, operate independently of the facility controller and/or the store interface unit for certain tasks and/or periods of time, as will be explained below.

Facility controller 120 may be a server, a personal computer, or any other appropriate device for interacting with and controlling fuel dispensers 110. Facility controller 120 typically includes a processor (e.g., a microprocessor, a microcontroller, or any other appropriate device for manipulating information in a logical manner) and memory (e.g., random access memory (RAM), read-only memory (ROM), compact-disk read-only memory (CD-ROM), programmable read-only memory (PROM), a hard drive, and/or any other appropriate information storage device) that stores instructions and/or data for the processor. The instructions may, for example, include an operating system (e.g., Linux, Unix, or Windows) and applications (e.g., fuel dispenser control, accounting, and diagnostics). Facility controller 120 may, for example, provide authorization, financial transaction, and fuel dispensing management for fuel dispensers 110. To accomplish this, facility controller 120 may provide one or more operational commands to the fuel dispensers. In particular implementations, a processor may be a single or dual 32-bit processor operating at 600 MHz, and memory may include 512 MB of main memory and 4 GB or storage. The facility controller may be located in or external to a store at a fueling facility.

Communication network 130 allows fuel dispensers 110 and facility controller 120, as well as store interface unit 140, to communicate with each other. Communication network 130 may operate according to any appropriate communication technique, including wireline (e.g., IEEE 802.3 or RS-232), wireless (e.g., IEEE 802.11, CDMA2000, or GPRS), or optical (e.g., FDDI or SONET). Communication network 130 may include one or more components for facilitating communication, such as hubs, routers, switches, bridges, repeaters, multiplexers, and transceivers. In particular implementations, communication network 130 may operate by a combination of communication techniques.

Communication network 130 is coupled to fuel dispensers 110, facility controller 120, and store interface unit 140 by communication links 150. Communication links 150 may be wireline (e.g., twisted pair wire or coaxial cable), wireless (e.g., radio frequency (RF) or infrared (IR)), optical (e.g., fiber-optic cable), and/or any other appropriate path for conveying information. In particular implementations, communication links 150 may include a combination of communication link types (e.g., wireline and wireless).

Store interface unit 140 may be a server, a personal computer, a data terminal, or any other appropriate device for interacting with fuel dispensers 110 and/or facility controller 120. Store interface unit 140 may include a processor and memory that stores instructions and/or data for the processor. Store interface unit 140 also typically includes a user input device (e.g., a keypad, a keyboard, a touch screen, and/or a pointing device) and a display device (e.g., a CRT or LCD monitor). Store interface unit 140 may, for example, allow a store attendant to provide authorization and financial transaction services for fuel dispenser 110. To accomplish this, the store interface unit may provide operational commands (e.g., dispense fuel, reserve for specific monetary amount, or print receipt) to the fuel dispensers. Store interface unit 140 may operate in conjunction with facility controller 120 to provide these services.

In one mode of operation, when one of fuel dispensers 110 detects the presence of a facility customer (e.g., by detecting removal of a pump handle, activation of a user input device, insertion of a payment card, or presence of a customer identifier), the fuel dispenser issues a notification to facility controller 120. Facility controller 120 may then determine the technique by which the customer plans to pay for the fuel to be dispensed (e.g., pay at the fuel dispenser or pay in the store). If the customer indicates that she is planning to pay at the fuel dispenser, the facility controller may request that the customer present a customer identifier (e.g., a payment card or an RFID tag) before allowing the customer to dispense fuel. If the customer indicates that she is planning to pay in the store, the facility controller may notify the store attendant and allow the store attendant to make a decision regarding whether fuel should be dispensed.

In the case that the customer indicates she is planning to pay at the fuel dispenser, the facility controller may prompt the fuel dispenser to request presentation of the customer identifier. The fuel dispenser may then wait for presentation of the customer identifier (e.g., insertion of a payment card) and read the information contained thereon.

Typically, at least some customer identification data is sent from the fuel dispenser to facility controller 120. The facility controller may then determine the validity of the customer identifier. Determining the validity of the customer identifier may include performing a checksum of the data received therefrom or contacting the issuer of the customer identifier to determine whether the customer identifier is valid. Also, the facility controller may check the authorization of the customer identifier. For example, the facility controller may contact a payment card issuer to determine the credit limit of a payment card.

If the facility controller determines that the customer identifier is valid and/or authorized, the facility controller may activate the fuel dispenser, which may then dispense fuel to the customer. While fuel is being dispensed, the fuel dispenser may provide the facility controller with data regarding the dispensing (e.g., type of fuel being dispensed and amount of fuel being dispensed). When the customer is finished dispensing fuel (e.g., indicated by replacement of the pump handle), the facility controller may determine a total price for the dispensed fuel and seek approval for the total price. Once approval has been granted, the facility controller may cause a receipt to be printed for the customer.

In certain modes of operation, however, one or more of fuel dispensers 110 may be able to operate independently of facility controller 120, at least for a certain functions and/or periods of time. This may be especially advantageous if facility controller 120, communication network 130, and/or communication links are prone to failure, which they often are.

As one example of independent operation, fuel dispensers 110 may include the ability to provide point-of-sale (POS) operations. That is, the customer may purchase fuel from a fuel dispenser without it having to be in contact with the facility controller or the store interface unit. Thus, if facility controller 120, communication network 130, and/or store interface unit 140 is inoperative, the fuel dispenser may continue dispensing fuel. To accomplish this, a fuel dispenser may, for example, be able to provide appropriate interaction with a customer (e.g., request customer identifier) and perform authentication operations for customer identification data (e.g., checksums). Not all authentication operation, for PINs, for example, in some implementations, may be able to be performed. The fuel dispenser may also be able to record dispensing and financial aspects of a fueling session, and provide appropriate commands to the fuel dispenser's components. The recorded dispensing and financial data may be provided to the facility controller for operations management and account reconciliation when communication therewith is reestablished.

While FIG. 1 illustrates one implementation of a system for fuel dispenser management, other implementations may have fewer, additional, and/or a different arrangement of components. For example, a system may not have a store interface unit. As another example, the facility controller may be co-located with or part of store interface unit 140. As a further example, the facility controller may be coupled to one or more off-site computer systems (e.g., a payment card issuer or a fuel supply system). The components and techniques discussed with respect to this implementation may also find use in a wide variety of other types of systems.

Figure 2:
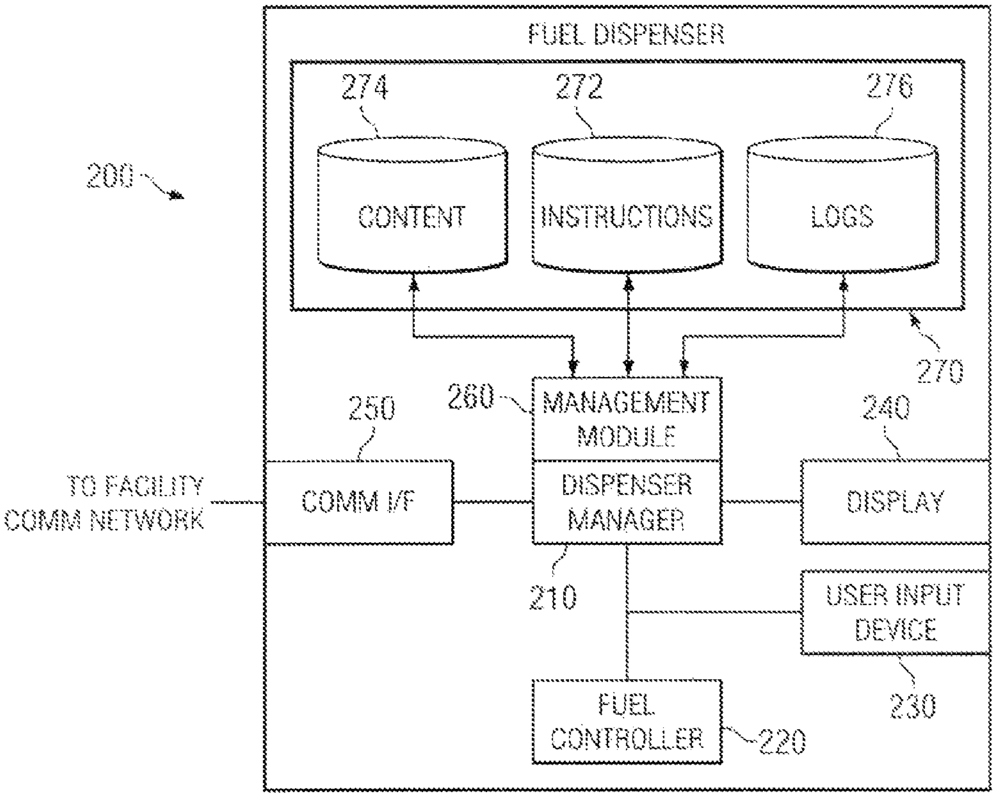
FIG. 2 is a block diagram illustrating one implementation of a fuel dispenser.

FIG. 2 illustrates one implementation of a fuel dispenser 200 for fuel dispenser management. Fuel dispenser 200 includes a dispenser manager 210, a fuel controller 220, a user input device 230, a display 240, a communication interface 250, and a management module 260. Fuel dispenser 200 may be one example of a fuel dispenser 110 for system 100.

Dispenser manager 210 is responsible for managing the operations of fuel dispenser 200. To accomplish this, the dispenser manager may control the electronic functions of fuel dispenser 200. The dispenser manager may also collect and maintain status information regarding the fuel dispenser and report the status information to a facility controller. Dispenser manager 210 may be implemented in software, hardware, or a combination thereof. As part of its functions, dispenser manager 210 may drive the content presented on display 240.

Fuel controller 220 controls the dispensing of fuel from fuel dispenser 200. To accomplish this, fuel controller 220 may control the hydraulic elements of the dispenser necessary to carry out fuel dispensing operations. For example, fuel controller 220 may control submersible pumps in fuel storage tanks and fuel control valves and monitor fuel flow information via metering and reporting sub systems. Fuel controller 220 may also track the volume of fuel dispensed totals by grade, drive sale progress displays on the sales/volume displays, and monitor for errors. Fuel controller 220 may be implemented in software, hardware, or a combination thereof.

User input device 230 is coupled to dispenser manager 210 and allows a customer of a fueling facility to interact with the fuel dispenser. User input device 230 may be a keypad, a keyboard, a touchpad, a touch screen, a card reader, or any other appropriate device for allowing a user to provide an indication to the fuel dispenser. If user input device 230 has portions, the portions may have static and/or rearrangeable (e.g., software programmable) functions.

Display 240 is also coupled to dispenser manager 210 and allows a customer of a fueling facility to receive data from the fuel dispenser. Display 240 may be a cathode ray tube (CRT) monitor, a liquid crystal display (LCD) monitor, a gas-plasma monitor, or any other appropriate device for visually presenting information. The content for display 240 may be provided by a facility controller and/or management module 260. If display 240 has portions, the portions may have static and/or rearrangeable functions (e.g., software programmable). In some implementations, the user input device and the display may work in concert with each other (e.g., the display may present instructions or data for the user input device and/or input from the user input device may correlate with data presented on the display).

Communication interface 250 is also coupled to dispenser manager 210 and allows the fuel dispenser to communicate with other components at a fueling facility. Communication interface 250 may be a modem, an RS-232 transceiver, a wireless transceiver, or any other appropriate device for sending and/or receiving information.

Management module 260 provides fuel dispenser 200 with the ability to operate independently of a facility controller, at least for certain operations and/or periods of time. These operations may, for example, allow the fuel dispenser to continue selling fuel when communication interface 250 is unable to send and/or receive data.

Management module 260 may access memory 270, which may be RAM, ROM, CD-ROM, and/or any other appropriate information storage device. Memory 270 includes instructions 272, content 274, and logs 276. Instructions 272 dictate at least some of the operations of management module 260. Content 274 may be text, graphics, images, and/or video for presentation on display 240. Content 274 may be presented in accordance with instructions 272. Logs 276 may contain data regarding transactions (e.g., fueling sessions, financial payment, or otherwise) and errors. By analyzing logs 276, transactions may be recreated and analyzed and errors may be identified and assessed.

Management module 260 may, for example, be implemented as a rule engine. In such an implementation, instructions 272 may be rules (e.g., customer interaction rules and transaction processing rules), content 274 may store data for implementing the results of rules, and logs 276 may store data for processing the rules. Rule engines typically have a set of conditions that are precursors to a result being implemented. The conditions may also be preconditions to other conditions. Rule engine techniques that may be used for management module 260 include those of JRules from ILOG, Inc. of Mountain View, Calif., Jess from Sandia National Laboratories of Livermore, Calif., or any other appropriate rule engine scheme. Management module 260 may be implemented using one or more programming and messaging technologies, including HTTP, TCP/IP, XML, SOAP, Universal Description, Discovery and Integration (UDDI), Microsoft .NET, or Java™. Portions of the module, for example, may be written in C++ in combination with other programming technologies (e.g., .NET) or any other appropriate technologies.

In one mode of operation, dispenser manager 210 operates under the control of a facility controller while the dispenser manager is able to communicate with a facility controller. Management module 260 may stand by in a passive mode during this time. The facility controller may provide content to be displayed on display 240, handle point-of-sale transactions (e.g., verify and charge credit cards), and provide any other appropriate services to the fuel dispenser.

When dispenser manager is unable to communicate with a facility controller, however, management module 260 may perform one or more duties of the facility controller. For example, management module 260 may provide content 274 to display 240. The content may, for example, allow a user to interact with fuel dispenser 200 to initiate and complete a fueling session (e.g., by providing customer instructions), the fueling facility to provide advertising at fuel dispenser 200, or any other appropriate operation. The content may be provided according to instructions 272. For instance, content to initiate a fueling transaction may be provided when an indication that a customer has interacted with the fuel dispenser has been detected.

As another example, management module 260 may provide processing for the financial transaction required for a fueling session (e.g., a POS transaction), allowing the fuel dispenser to dispense fuel even if the facility controller or communication network are inoperative. POS services could include cash register, dispenser control, transaction card processing, and/or bar code scanning.

For instance, the management module may determine whether to initiate a fueling session and, if a fueling session is to be initiated, to record the pertinent portions of the transaction (e.g., time of day, credit card number, current price, purchased quantity, and purchased amount). The pertinent portions of the transaction may be recorded in logs 276. In determining whether to initiate a fueling session, management module 260 may validate a customer identification information (e.g., by performing a checksum) and may determine whether the fuel dispenser is still allowed to dispense fuel. For example, the fuel dispenser may be allowed to independently dispense fuel for a certain amount of time (e.g., six hours), for a certain number of transactions (e.g., twenty-five), for a certain quantity of fuel (e.g., five-hundred gallons), and/or for a certain purchase amount (e.g., one-thousand dollars). For specific transactions, the fuel dispenser may determine whether the customer identification data is valid and/or limit the transaction to a certain amount (e.g., fifty dollars). The determinations may occur according to instructions 272.

The dispenser manager 210 may generate representations of appropriate dispenser control signals for the management module. For example, substitutes for customer activated terminal (CAT) and pump commands, which are normally sent from the facility controller, could be provided.

When dispenser manager 210 is again able to communicate with the facility controller, management module 260 may download the transaction data from logs 276. The facility controller may then process the financial data and send the data to the appropriate entity (e.g., payment card issuer or electronic clearing house (ECH)) for completion of the financial transaction. The facility controller may also update its information regarding the fueling facility (e.g., amount of fuel remaining).

In certain modes of operation, the management module may also be active while the fuel dispenser is communicating with a facility controller. Types of services that the management module may provide include POS. POS functions, which were discussed above, may, for example, be provided at a fuel dispenser on a full time, or close to full time, basis.

In certain implementations, management module 260 may be responsible for providing messages (e.g., commands and/or data) to dispenser manager 210 to accomplish the module's operations. For example, the management module may forward or replace messages (whether in the form of structured messages, unstructured messages, or signals) from a remote computer (e.g., a facility controller). The management module may, for instance, receive a command message form a remote computer and determine that the message should be provided to the dispenser manager 210 in an unaltered state. This may, for example, occur when the fuel dispenser is operating in a normal mode and the message relates to normal operations. The management module 260 may, thus, pass the message through to the dispenser manager. As another example, the management module 260 may have one or more particular techniques for communicating with the dispenser manager and, thus, replace a message from a remote computer with a message that accomplishes the same function. As a further example, the management module 260 may determine that it desires the fuel dispenser to perform a function and issue a message to the dispenser manger 210 in further of performance of the function. For example, substitutes for customer activated terminal (CAT) and pump messages, which are normally sent from a facility controller, could be provided.

Although FIG. 2 illustrates one implementation of a fuel dispenser, other fuel dispenser implementations may include fewer, additional, and/or a different arrangement of components. For example, a fuel dispenser may not include content, as it may not be required for customer operation of the fuel dispenser. As another example, a fuel dispenser may include a number of displays and user input devices, especially if the fuel dispenser has multiple dispensing sides. As a further example, memory for the management module may be shared with memory for the dispenser manager 210. Moreover, the memory for the management module may have various forms and/or arrangements.

Figure 3:
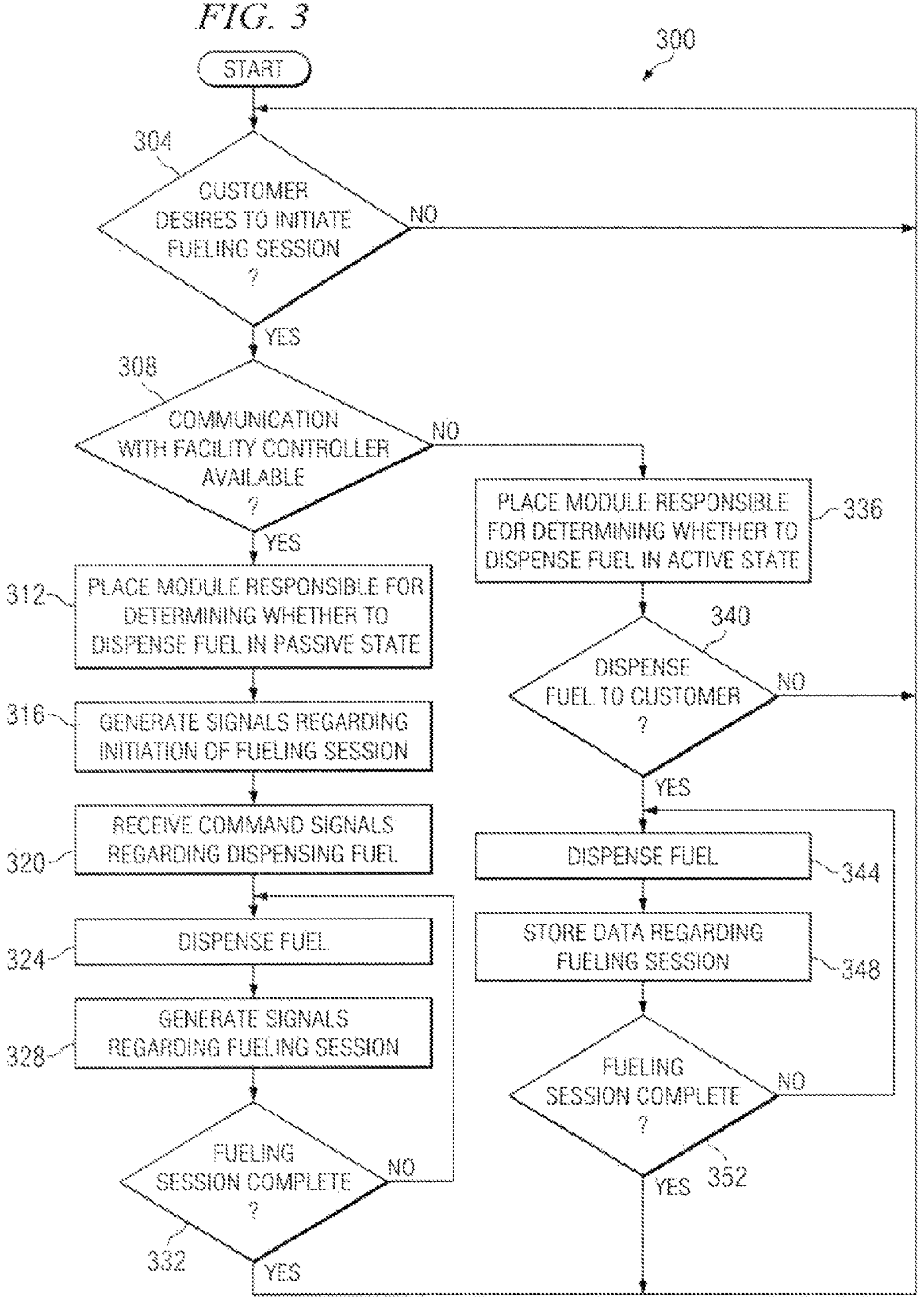
FIG. 3 is a flow chart illustrating one implementation of a process for fuel dispenser management.

FIG. 3 illustrates one implementation of a process 300 for fuel dispenser management. Process 300 may, for example, illustrate one mode of operation for one of fuel dispensers 110 in system 100.

Process 300 begins with waiting until a customer desires to initiate a fueling session (operation 304). Determining whether a customer desires to initiate a fueling session may, for example, be accomplished by detecting the removal of a pump handle, the activation of a keypad, or the insertion of a payment card.

When a customer desires to initiate a fueling session, process 300 calls for determining whether communication with a facility controller is available (operation 308). Determining whether communication with a facility controller is available may, for example, be accomplished by determining whether a facility controller responds to status requests. If communication with a facility controller is available, process 300 continues with placing a module responsible for determining whether to dispense fuel in a passive state (operation 312) and generating signals regarding initiation of a fueling session (operation 316). The module may, for example, be a point-of-sale module, and the signals may indicate to a facility controller that a customer desires a fueling session.

Process 300 continues with receiving command signals regarding dispensing fuel (operation 320). These signals may, for example, include information regarding retrieving payment data from a customer and dispensing authorization. Process 300 also calls for dispensing fuel (operation 324) and generating signals regarding the fueling session (operation 328). The signals may, for example, indicate the fuel dispenser status (e.g., pumping) and the status of the session (e.g., amount of fuel dispensed). Process 300 also includes determining whether the fueling session is complete (operation 332). Determining whether the fueling session is complete may, for example, be accomplished by detecting that a pump handle has been replaced, the activation of a keypad, or any other appropriate session completion indication.

If the fueling session is complete, the process calls for returning to wait until a customer desires to initiate a fueling session (operation 304). If, however, the fueling session is not complete, the process calls for continuing to dispense fuel (operation 324).

When a customer desires to initiate a fueling session and communication with a facility controller is not available, process 300 calls for placing the module responsible for determining whether to dispense fuel into an active state (operation 336) and determining whether to dispense fuel to the customer (operation 340). Determining whether to dispense fuel may, for example, be accomplished by requesting customer identification data from the customer and analyzing the data to determine whether it is acceptable. For instance, an error check (e.g., checksum) could be performed on the customer identification data. As another example, the fuel dispenser could determine whether it is still operating within one or more pre-established guidelines (e.g., dispense no more than five-hundred gallons of fuel when module is active).

If fuel should not be dispensed to the customer, process 300 calls for returning to wait until a customer desires to initiate a fueling session (operation 304). If, however, fuel should be dispensed to the customer, process 300 calls for dispensing fuel (operation 344). Dispensing fuel may, for example, include generating an activation signal for a fuel controller. Process 300 also calls for storing data regarding the fueling session (operation 348). The data may, for example, be stored in a transaction log and could include time, date, customer identification data, dispensed amount, and total price.

Process 300 continues with determining whether the fueling session is complete (operation 352). If the fueling session is not complete, the process calls for continuing to dispense fuel (operation 344). If, however, the fueling session is complete, the process calls for returning to wait until a customer desires to initiate a fueling session (operation 304).

Although FIG. 3 illustrates one implementation of a process for fuel dispenser management, other processes for fuel dispenser management could include fewer, additional, and/or a different arrangement of operations. For example, a dispenser management process could include determining whether communication with a facility controller is available before determining that a customer desires to initiate a fueling session. As another example, a management process may place the module responsible for determining whether to dispense fuel in an active or inactive state before determining whether communication with a facility controller is available. Thus, the activation or deactivation of the module may not depend on the communication status of the facility controller. As a further example, a management process may generate and receive signals regarding a fueling session numerous times before, during, and/or after a fueling session. As an additional example, a management process may send data stored when communication with a facility controller was not available when communication with a facility controller is available.

Figure 4:
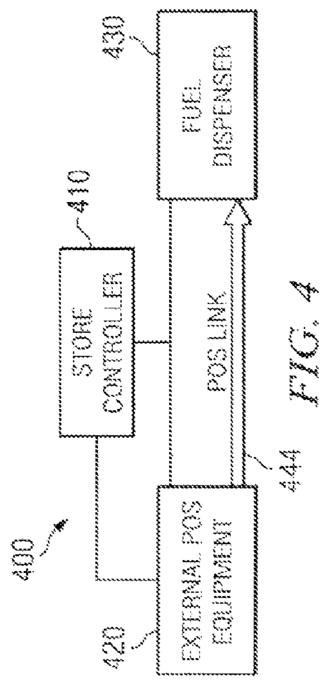
FIG. 4 is a block diagram illustrating another implementation of a system for fuel dispenser management.

FIG. 4 illustrates another implementation of a system 400 for fuel dispenser management. System 400 includes a store controller 410, external point-of-sale (POS) equipment 420, a fuel dispenser 430, and a POS link 444. System 400 could also include additional fuel dispensers, but one is sufficient for understanding system 400. Store controller 410 and external POS equipment 420 are interconnected with fuel dispenser 430 to control at least some of its operations.

Typically, a fuel dispenser within existing fueling facilities is dependent upon data transmitted to it from external POS equipment 420 over POS link 444 for initiating a fueling session. External POS equipment may, for example, be part of a facility controller. The transmitted POS data enables POS equipment 420 to control financial transactions and pump functions. In system 400, however, fuel dispenser 430 has the ability to perform at least some POS functions on its own. For example, fuel dispenser 430 may determine whether to accept a payment card, dispense fuel if the payment card is acceptable, and record data for completing the billing as the fueling session progresses. Thus, fuel dispenser 430 may, at least for an operationally-significant period of time (e.g., several hours), operate in an autonomous mode from external POS equipment 420, which provides robustness to system 400, as well as increased opportunity for fueling transactions for customers.

Figure 5:
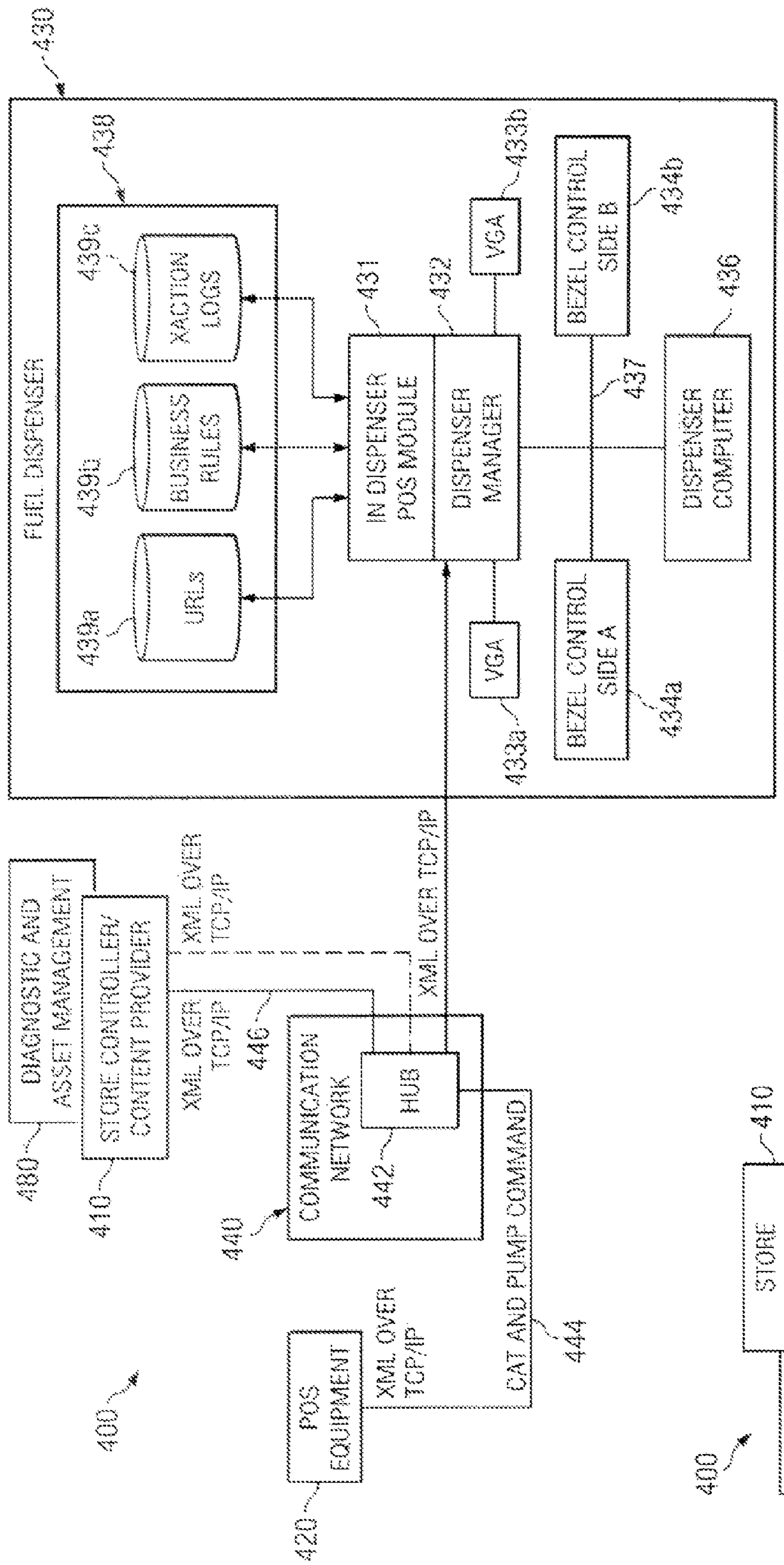
FIG. 5 is a block diagram illustrating a detailed implementation of the system of FIG. 4.

FIG. 5 illustrates a detailed view of one implementation of system 400. In this implementation, fuel dispenser 430 includes an in-dispenser POS module 431 that allows the fuel dispenser to conduct fueling sessions in a stand-alone mode if POS equipment 420 or POS link 444 should become inoperable. For example, POS module 431 may provide POS functionalities, which may include cash register, dispenser control, transaction card processing, and/or bar code scanning.

Store controller 410, POS equipment 420, and fuel dispenser 430 are coupled together via communication network 440. In this implementation, communication network 440 includes a hub 442 for distributing the communications between the components. POS equipment 420 generates customer activated terminal (CAT) and pump commands that are transmitted to fuel dispenser 430 through hub 442 via link 444. The commands may be represented by signals, structured messages, or other appropriate techniques by which to communicate information. Store controller 410 is linked with hub 442 via a communication link 446. System 400 also includes a diagnostic and asset management system 480, which, as illustrated here, can be located in the store or elsewhere at the fueling facility. Diagnostic and asset management system 480 is also coupled to hub 442 via communication link 446.

Fuel dispenser 430 includes a dispenser manager 432, a pair of VGA displays 433 including soft keys and controllers 434 for managing peripheral elements or a bezel. Dispenser manager 432 or POS module 431 drives the content associated with the VGA display(s) 433 to provide interaction with a customer. Bezel controllers 434 provide for and control user inputs to fuel dispenser 430.

Fuel dispenser 430 also includes a dispenser computer 436. Dispenser computer 436 controls the fuel flow aspects of fuel dispenser 430. For example, dispenser computer 436 may control fuel-storage-tank submersible pumps and fuel control valves and monitor fuel flow information via metering and reporting sub systems, totals by grade, errors, and the like. Dispenser manager 431 interoperates with dispenser computer 436 to deliver commands and receive transaction data and status. For example, dispenser manager 432 may issue commands to dispenser computer 436 over an internal communication link 437 (e.g., a bus) of dispenser 430. Control, status, real-time diagnostic, error codes, and data may also be exchanged over communication link 437. In addition to controlling the fuel-flow aspects of the dispenser necessary to carry out fuel dispensing functionalities, dispenser computer 436 may also drive sale progress displays on sales/volume displays of dispenser 430. Dispenser manager 432 also collects and maintains status of fuel dispenser 430 and reports the status information to store controller 410 and/or POS equipment 420.

POS module 431 is associated with dispenser manager 432 within fuel dispenser 430 and provides a fault-tolerant architecture, assuring dispenser functionality in the event that POS equipment 420, HUB 442, or link 444 crashes, goes off-line, or otherwise become unavailable. To accomplish this, POS module 431 is operable to perform the relevant POS functionalities for operating fuel dispenser 430 in an autonomous mode for at least some operationally-significant period of time (e.g., two hours). These functionalities include, but are not limited to, store/forwarding, transaction logging, and URL and payment card processing. These functionalities may be a subset of the functionality necessary to operate a fuel dispenser on a longer-term basis, which may reside in POS equipment 420.

To assist it with its operation, POS module 431 accesses a number of databases 439 stored within a memory 438 of fuel dispenser 430. Databases 439 include data for operating POS module 431 in the stand-alone mode. This data could include, but is not limited to, URLs 439*a* or display content including customer instructional prompts, fueling status information, advertisements, various business rules 439*b* (including fuel prices, tender media authorization information, pump operational rules, etc.) for operation of the POS module, and completed transaction and error logs 439*c*.

System 400 provide a variety of features. For example, due to the networking and POS functionality available in the fuel dispenser, the system is able to be implemented with standardized networking technologies. Thus, distribution boxes, third-party interface boxes, and third-party POS intermediaries may be eliminated.

Although FIG. 5 illustrates one implementation of system 400, other implementations of system 400 may include fewer, additional, or a different arrangement of components. For example, a system may not include a store controller. As another example, the POS equipment may be co-located with and/or part of the store controller. As a further example, a fuel dispenser may have a variety of configurations, as illustrated in FIGS. 6-8.

Figure 6:
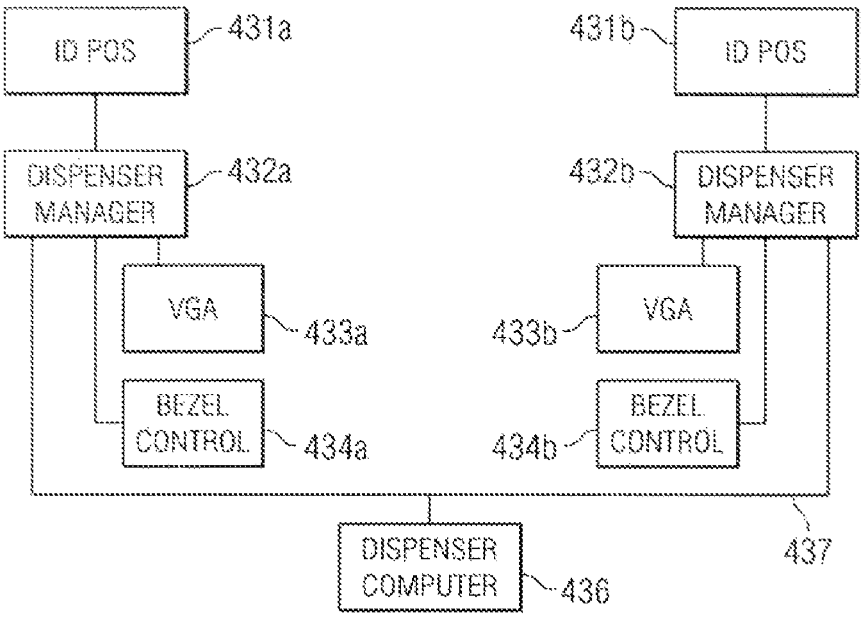
FIG. 6 is a block diagram illustrating a particular implementation of a fuel dispenser for the system of FIG. 4.

FIG. 6 illustrates a particular implementation of a fuel dispenser for system 400. The fuel dispenser in this implementation includes associated in-dispenser POS modules 431 and dispenser managers 432. The dispenser managers and the in-dispenser POS modules may, for example, be associated with different sides of the fuel dispenser. Dispenser managers 432 provide visual data to and receive indications of user input from respective displays 433 and controllers 434. Dispenser managers 432 may both communicate with dispenser computer 436 through communication link 437 for requesting fuel and receiving fuel-related data.

Figure 7:
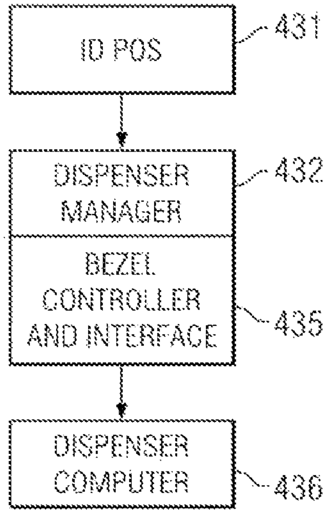
FIG. 7 is a block diagram illustrating another implementation of a fuel dispenser for the system of FIG. 4.

FIG. 7 illustrates another implementation of a fuel dispenser for system 400. The fuel dispenser in this implementation includes a bezel controller and interface 435 for receiving input to the fuel dispenser. The bezel controller and interface provides the data to dispenser manager 432, which may provide appropriate data to in-dispenser POS module 431. Dispenser manager 432 may communicate with dispenser computer 436 through bezel controller and interface 435.

Figure 8:
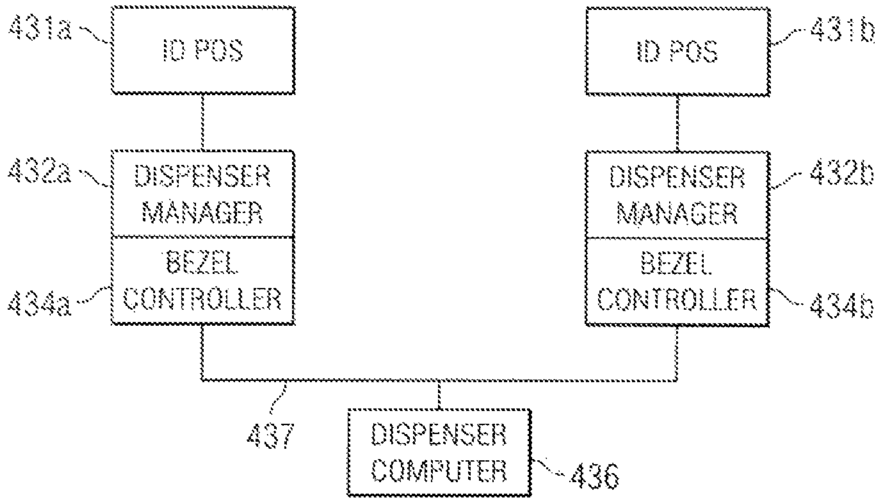
FIG. 8 is a block diagram illustrating still another implementation of a fuel dispenser for the system of FIG. 4.

FIG. 8 illustrates still another implementation of a fuel dispenser for system 400. The fuel dispenser in this implementation includes associated in-dispenser POS modules 431 and dispenser managers 432. The dispenser managers and the in-dispenser POS modules may, for example, be associated with different sides of the fuel dispenser. Dispenser managers 432 receive indications of user input from respective controllers 434. Dispenser managers 432 may both communicate with dispenser computer 436 through communication link 437, for requesting fuel and receiving fuel-related data.

Figure 9:
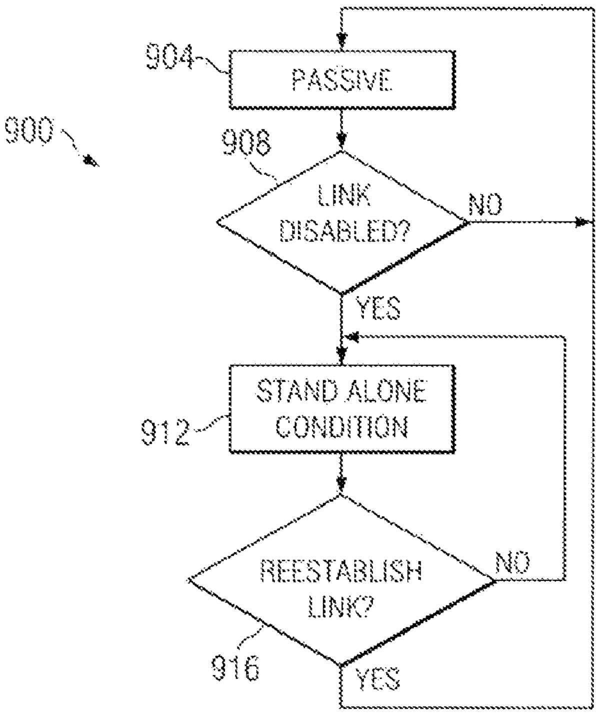
FIG. 9 is a flow chart illustrating one example of a process for fuel dispenser management.

FIG. 9 illustrates one example of a process 900 for fuel dispenser management. In particular, process 900 is an example of a process for operating a POS module such as POS module 431. In process 900, POS module 431 remains in a passive condition while external POS equipment is operating in normal application mode (operation 904). However, once it is determined that the link with the external POS equipment is unavailable (operation 908), the POS module begins to operate in a stand-alone condition (operation 912) until it is determined that the link with the external POS equipment has been re-established (operation 916). After the link is re-established, the POS module returns to the passive condition (operation 904).

Although FIG. 9 illustrates one implementation of a process for operating a POS module, other processes for operating a POS module may include fewer, additional, and/or a different arrangement of operations. For example, a POS module may operate on a full time basis. This could provide for a scaled-back version of the facility controller as described with respect to FIG. 1, since most POS functionalities could be handled by the fuel dispenser. As another example, the POS module may be commanded to operate while the external POS equipment is to be taken offline, for repair or replacement. Thus, a POS module could be proactively engaged to support fueling facility operations.

A number of implementations have been described, and a variety of other implementations have been mentioned or suggested. Furthermore, numerous additions, deletions, modifications, and/or substitutions to these implementations will be readily suggested to those skilled in the art while still achieving fuel dispenser management. For at least these reasons, the invention is to be measured by the following claims, which may encompass one or more aspects of one or more of the implementations.

The invention claimed is:

1. A fuel dispenser having a communication link with a facility controller that controls fuel dispensing at a facility, the fuel dispenser comprising:

- a dispenser manager that controls fuel dispensing components of the fuel dispenser during a fueling session, the fuel dispenser further generating fueling session data of the fueling session;
- a display that displays a visual representation of the fueling session data based on operation of the fuel dispensing components controlled by the dispenser manager;
- a user input device coupled to the dispenser manager, the user input device operable to detect user instructions during the fueling session;
- a fuel controller coupled to the dispenser manager, the fuel controller operable to control fuel flow operations during the fueling session; and
- a management module associated with the dispenser manager, the management module operable to generate operational commands for the dispenser manager to implement the fueling session based at least in part on the user instructions detected by the user input device the management module configured to suspend communication of the fueling session data with the facility controller over the communication link during the fueling session.

2. The fuel dispenser of claim 1, wherein the management module comprises instructions for generating the operational commands.

3. The fuel dispenser of claim 2, wherein the instructions dictate point-of-sale operations for the fuel dispenser.

4. The fuel dispenser of claim 3, wherein the instructions comprise financial transaction rules.

5. The fuel dispenser of claim 1, wherein the management module comprises operating content and operating logs.

6. The fuel dispenser of claim 5, wherein:

- operating content comprises data to be presented on the display; and
- operating logs comprise transaction logs.

7. The fuel dispenser of claim 6, wherein data comprises at least one of customer instructional prompts, fueling status, advertisements, and fuel prices.

8. The fuel dispenser of claim 6, wherein the transaction logs comprise fueling session financial transaction logs and error logs.

9. The fuel dispenser of claim 1, wherein the management module allows the fuel dispenser to operate when the fuel dispenser cannot receive operational commands from the facility controller.

10. The fuel dispenser of claim 9, wherein the management module comprises a point-of-sale module for providing point-of-sale operations at the fuel dispenser.

11. The fuel dispenser of claim 10, wherein the point-of-sale module has a passive state and an active state.

12. The fuel dispenser of claim 11, wherein the point-of-sale module remains in the passive state when the fuel dispenser can communicate with a facility controller and transitions to the active state when the fuel dispenser cannot communicate with a facility controller.

13. The fuel dispenser of claim 11, wherein the point-of-sale module operates primarily in the active state.

14. The fuel dispenser of claim 1, wherein the management module is operable to generate operational commands for the dispenser manager based on operational commands from a remote fueling facility computer.

15. A fuel dispensing system, the system comprising:

- a fueling facility controller operable to provide point-of-sale and pump control operation commands to one or more fuel dispensers;
- a communication network coupled to the fueling facility controller; and
- one or more fuel dispensers coupled to the fueling facility controller via the communication network, each of the one or more fuel dispensers comprising:
  - a dispenser manager that controls fuel dispensing components of the fuel dispenser during a fueling session, the fuel dispenser further generating fueling session data of the fueling session;
  - a display that displays a visual representation of the fueling session data based on operation of the fuel dispensing components controlled by the dispenser manager;
  - a user input device coupled to the dispenser manager, the user input device operable to detect user instructions during the fueling session;

a fuel controller coupled to the dispenser manager, the fuel controller operable to control fuel flow operations during the fueling session; and a management module associated with the dispenser manager, the management module operable to generate operational commands for the dispenser manager to implement the fueling session based at least in part on the user instructions detected by the user input device, the management module configured to suspend communication of the fueling session data with the facility controller over the communication link during the fueling session.

16. The fuel dispensing system in accordance with claim 15, wherein the operational commands generated by the management module include operational commands received from a remote fueling facility computer, and comprising instructions for operating the fuel dispenser, the instructions providing point-of-sale operations, including financial transaction rules, at the fuel dispenser.

17. The fuel dispensing system in accordance with claim 15, wherein the operational commands include operating content operable for presentation on the display to provide customer instructional prompts, fueling status information, advertisements, and fuel prices.

18. The fuel dispensing system in accordance with claim 17, wherein the operational commands include operating logs including transaction logs, the transaction logs comprising fueling session financial transaction logs and error logs.

19. The fuel dispensing system in accordance with claim 15, wherein the management module has a passive state and an active state, the management module remaining in the passive state when the fuel dispenser can communicate with the fueling facility controller, transitioning to the active state when the fuel dispenser cannot communicate with the fueling facility controller and allowing the fuel dispenser to complete the fueling session without communication of fueling session data between the fuel dispenser and the fueling facility controller during the fueling session when in the active state, and returning to the passive state when the fuel dispenser can communicate with the fueling facility controller.

* * * * *